(12) United States Patent
Costantini

(10) Patent No.: US 7,726,055 B2
(45) Date of Patent: Jun. 1, 2010

(54) ELECTRONIC BUTTON TAG FOR TAGGING AND IDENTIFYING CATTLE

(75) Inventor: Anne Costantini, La Guerche de Bretagne (FR)

(73) Assignee: Allflex Europe S.A.S., Vitre Cedex (FR)

( * ) Notice: Subject to any disclaimer, the term of this patent is extended or adjusted under 35 U.S.C. 154(b) by 31 days.

(21) Appl. No.: 10/531,631

(22) PCT Filed: Oct. 14, 2003

(86) PCT No.: PCT/EP03/50716

§ 371 (c)(1),
(2), (4) Date: Apr. 14, 2005

(87) PCT Pub. No.: WO2004/034779

PCT Pub. Date: Apr. 29, 2004

(65) Prior Publication Data

US 2006/0117619 A1  Jun. 8, 2006

(30) Foreign Application Priority Data

Oct. 14, 2002  (FR)  ................................. 02 12739

(51) Int. Cl.
*G09F 3/00* (2006.01)
(52) U.S. Cl. .......................... 40/301; 40/668; 24/704.1; 340/572.1; 343/718

(58) Field of Classification Search ................. 414/462; 40/301, 300, 302, 668; 24/113 R, 113 MP, 24/704.1, 114.4; 343/718; 70/57.1; 340/547.9, 340/573.1, 573, 572.9, 572.1, 572.8
See application file for complete search history.

(56) References Cited

U.S. PATENT DOCUMENTS

| 5,016,368 | A | * | 5/1991 | Cassata | 40/666 |
| 5,347,262 | A | * | 9/1994 | Thurmond et al. | 340/572.9 |
| 5,375,302 | A | * | 12/1994 | Takamura | 24/114.4 |
| 5,768,813 | A | * | 6/1998 | Reboul et al. | 40/301 |
| 6,501,430 | B1 | * | 12/2002 | Esselink | 343/718 |
| 6,666,170 | B1 | * | 12/2003 | Hilpert | 119/814 |
| 2006/0117619 | A1 | * | 6/2006 | Costantini | 40/301 |
| 2007/0199215 | A1 | * | 8/2007 | Gardner et al. | 40/301 |
| 2008/0047177 | A1 | * | 2/2008 | Hilpert | 40/301 |
| 2008/0250682 | A1 | * | 10/2008 | Costantini et al. | 40/301 |

* cited by examiner

*Primary Examiner*—William L. Miller
(74) *Attorney, Agent, or Firm*—Kauth, Pomeroy, Peck & Bailey LLP

(57) ABSTRACT

The invention relates to an electronic button tag for tagging and identifying cattle and other animals, of the type which is intended to be placed on one of the ears of the animal. The inventive button tag includes a transponder which is enclosed in a shell. The shell is made from two half-shells, namely a lower half-shell and an upper half-shell, which are assembled together at a median plane. The transponder is fixed in place, without compression. between the two half-shells using a glue; and the two half-shells are assembled by a laser weld.

22 Claims, 4 Drawing Sheets

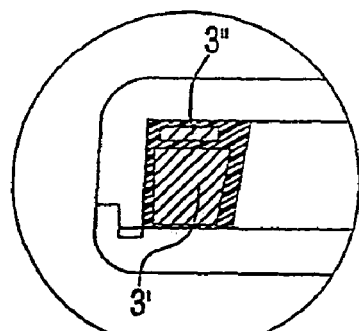
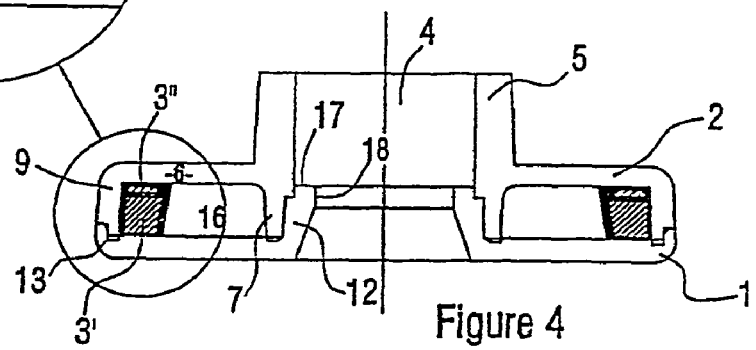
Figure 5
Figure 4
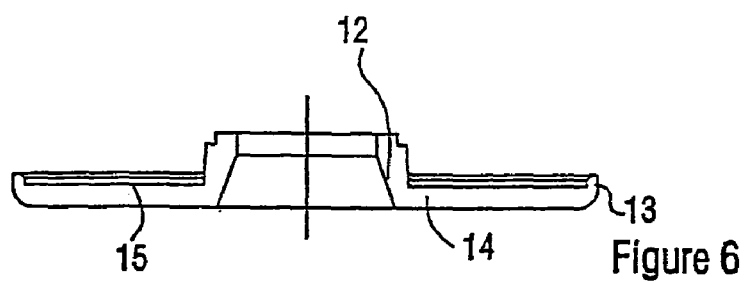
Figure 6
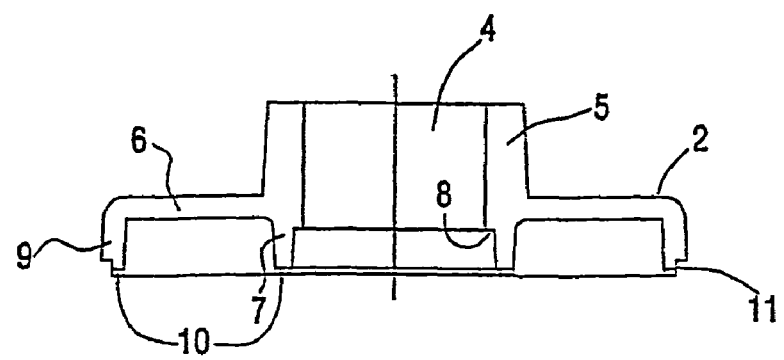
Figure 7

ELECTRONIC BUTTON TAG FOR TAGGING AND IDENTIFYING CATTLE

The present invention relates to an electronic button tag for tagging and identifying cattle and other animals, of the type which is intended to be fastened to one of the ears of the animal, said button tag containing electronic tracking means.

In known manner, the devices to this effect intended to ensure the electronic tracking of animals, in particular productive livestock, from birth to slaughter and/or to the final consumer, consist of a tag comprising a panel with a male punch that passes through the ear and locks into a panel having a female head.

The tag panels are provided with conventional and indelible markings.

An electronic button tag is attached to this known ear tag, having any form, for example circular, and provided with an axial opening for the male punch to pass through.

This button tag according to the invention constitutes the female head that receives the male punch.

This electronic button tag encloses a transponder, programmable or not, having a coil and microprocessor.

The transponder can be duplicate moulded or enclosed between two half-shells that are assembled by gluing or by ultrasound welding in known manner.

One of the problems encountered in the case of the known button tag and the manufacturing processes employed, lies in the requirement not to damage the transponder during assembly, and to be able to remove it from the button tag should the need arise without harming it or affecting the data within the microprocessor.

This last point is particularly important if it is necessary to analyse this data, for example when troubleshooting.

The known button tags do not fulfil this requirement.

When the transponder is overmoulded by pressure coating in a molten synthetic material, mechanical stresses are generated, in particular on cooling, which can lead to a change in the shape of the coil and its usage frequency with an overall reduction in the performance of the transponder.

When the shells enclosing the transponder are fitted together by gluing, these shells are manufactured from one or several rigid synthetic materials.

In the long term, gluing proves to be unsatisfactory because the glues deteriorate under the effects of exposure to ultraviolet rays or simply as a result of aging.

This can lead to moisture penetration and corrosion of the transponder.

It is important that the electronic button tag does not deteriorate in use as the tagging achieved by the latter should last for the entire life of the animal to ensure that the movements of the animal can be tracked.

Furthermore, the mechanical resistance of the bond between the half-shells can deteriorate, leading to their separation as the result of a mechanical action, for example rubbing up against vegetation.

Nor is ultrasound welding satisfactory, due to the substantial thickness required in the half-shells to be welded, which does not allow the production of small shells suitable for sheep and pigs, for example.

The object of the present invention is to remedy the above disadvantages by enabling the manufacture of small button tags that are less likely to be snagged in vegetation or fencing and in which the transponder will not be damaged during the assembly operation or in use.

To this end, the electronic button tag for tagging and identifying cattle and other animals according to the invention comprises a shell with an axial transverse passage for a fixing means to the ear of the animal, said shell enclosing a transponder is essentially characterised in that the shell is made from two half-shells namely a lower half-shell and an upper half-shell, which are assembled together at a median plane which is disposed transversely to the passage opening for the fixing means.

The transponder is fixed in place without compression between the two half-shells using a glue. By glue is meant more generally any substance capable of ensuring that the transponder is fixed in place, such as a gel or a fixing agent that must be non-aggressive and/or neutral in relation to the materials making up the transponder.

The two half-shells are assembled by means of a laser weld.

The electronic button tag according to the invention is characterised in that the two half-shells are provided with internal and external walls and/or one or several internal projections, which can be complementary, contributing at one and the same time to their assembly, to stiffening the shell and to fixing the internal transponder in place.

The electronic button tag is characterised in that the upper half-shell comprises a sleeve with a central opening around the median axis on a planar wall, wherein one cylindrical wall projects outwards on an inner cylindrical wall, below said planar wall connecting with a corresponding cylindrical wall on the lower half-shell, the planar wall of the upper half-shell being connected on its periphery to an orthogonal cylindrical wall connecting it to the lower half-shell, said cylindrical wall being orthogonal to the planar wall of the lower half-shell.

According to another embodiment, the electronic button tag is characterised in that the lower half-shell comprises a cylindrical inner wall around its median axis corresponding to that of the upper half-shell and providing the passage for the fixing means of the button tag to the animal's ear, and in that it is provided with a projecting peripheral rim cooperating with the orthogonal peripheral wall of the upper half-shell.

The electronic button tag is characterised in that the internal projection(s) is/are placed between the internal cylindrical wall and the peripheral rim.

Preferably, an internal circular projection is provided on the internal face of the planar circular wall between the internal cylindrical wall and the peripheral rim.

According to another embodiment, the electronic button tag is characterised in that the internal projection is of a lesser height than the clearance allowed in the button tag for fixing the microprocessor in place.

Further advantages and characteristics of the invention will become apparent on reading the following description of a form of embodiment given as a non-limiting example and illustrated by the attached drawings, in which:

FIG. 4 is a cross-sectional view of another embodiment of the button tag according to the invention;

FIG. 5 is a view of an enlarged portion of FIG. 4;

FIGS. 6 and 7 are views of the lower and upper half-shells according to the embodiment of FIG. 4.

Figure 8:
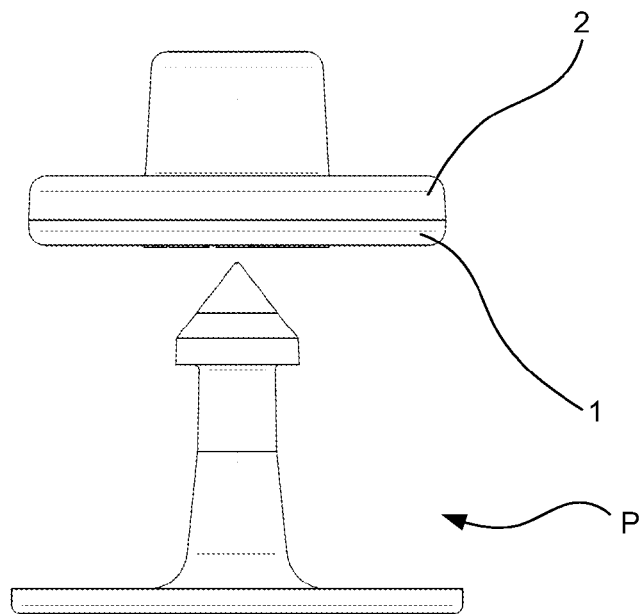
Figure 9:
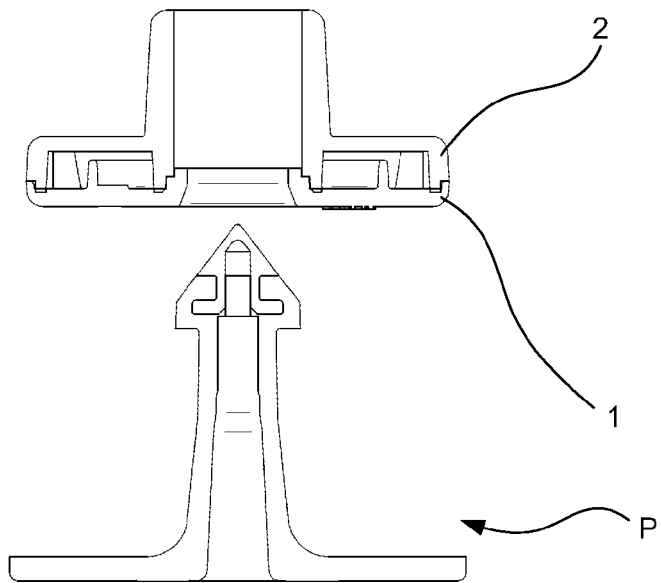
Figure 10:
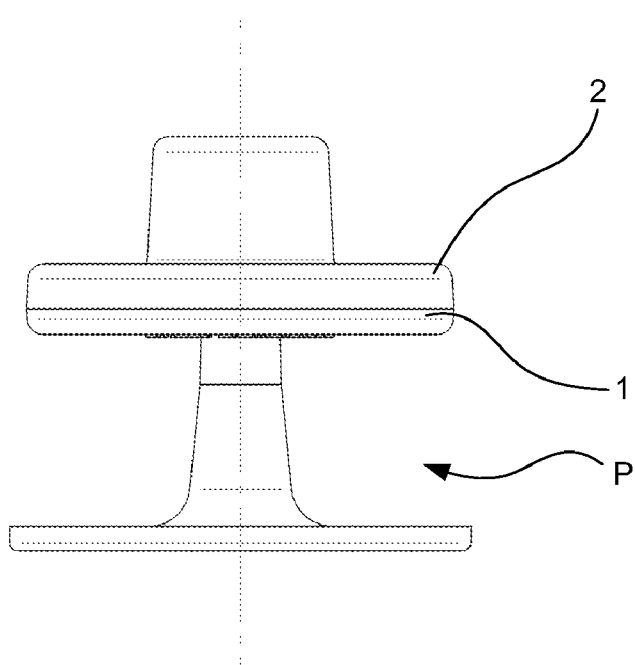
Figure 11:
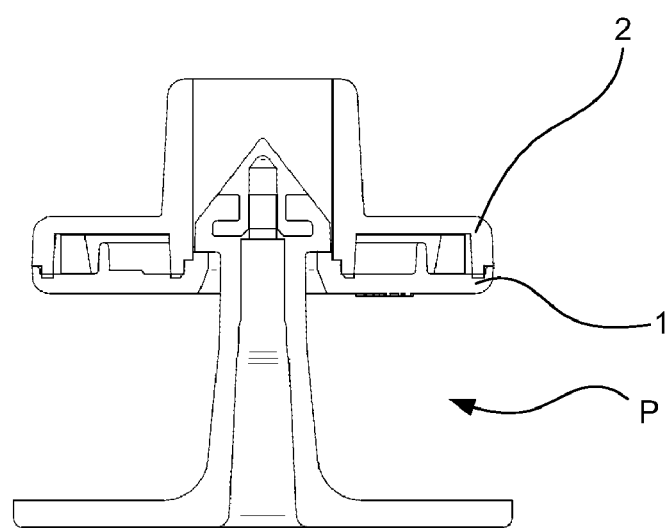

FIG. 8 shows the button tag together with a male punch; FIG. 9 is a cross-section through the button tag and male punch of FIG. 8; FIG. 10 shows the button tag having received the male punch; and FIG. 11 is a cross-section through the button tag and male punch of FIG. 10.

The electronic button tag according to the invention consists of a shell made of synthetic material being the assembly of two half-shells 1 and 2 between which is placed a transponder of known type comprising a coil 3' and a programmable microprocessor 3".

The shell formed by the assembly of the two half-shells 1-2 is preferably circular in form.

The shell is provided with a transverse axial passage 4 through its centre for a means of fixing it to the animal's ear, said means being the stem of the male punch P of the ear tag.

Said axial passage may be open-ended when the button tag consists of an open female head for receiving the conical tip of the male tag or said passage may be blind and blocked at one end in the case of a button tag consisting of a closed head.

The button tag has a direction in which it is intended to be applied, with the planar face of the half-shell 1 to be placed against the ear of the animal.

The half-shells 1-2 are assembled together at a median plane, which is disposed transversely to the opening 4.

The half-shell 1 is referred to as lower.

The half-shell 2 is referred to as upper.

The transponder 3, 3', 3" is fixed in place as described below between the shells 1-2, which are welded together by laser.

The lower half-shell 1 and the upper half-shell 2 are provided with external and internal walls and with one or several internal projections, which can be complementary or not, contributing to their assembly, to stiffening the shell, to fixing the internal transponder in place and to the welding together the of the two half-shells.

The upper half-shell 2 comprises a cylindrical through sleeve around the median axis, wherein the cylindrical wall 5 projects outwards on a planar circular wall 6.

The wall 5 is extended inwards by a cylindrical wall 7 below the wall 6.

The cylindrical wall 7 is provided with a shoulder 8 on the side of the passage 4 acting as a stop when the lower half-shell is attached, thus fixing the interior space required to protect the transponder.

The planar wall 6 is connected on its periphery to a vertical wall 9, orthogonal to the former and cylindrical, and which connects to the lower half-shell.

The ends of walls 7/9 are on the same plane.

The ends of walls 7/9 are provided with flux cores 10 along their length, that is to say a bead of synthetic material that melts on welding, dimensioned so that the surplus material melted on welding is the minimum possible without affecting the quality of the welding operation.

The end of wall 9 is provided with an external shoulder 11 corresponding with a complementary shoulder on the lower half-shell.

The lower half-shell 1 comprises an internal cylindrical wall 12 around its median axis, complementary to the wall 7 of the upper half-shell and provided with a shoulder to lock into shoulder 8 of the latter.

The shoulders are calculated to ensure a functional clearance inside the button tag of the order of 0.1 millimeters in relation to the transponder.

The lower half-shell is provided with a peripheral rim 13 projecting from the end of the planar wall 14.

On assembly, the peripheral rim 13 fits into the shoulder 11 of wall 9 at the edge of the upper half-shell 2.

Advantageously, the inner edge of the peripheral rim 13 is bevelled.

The function of the rim is to prevent overspill, ensuring that any spillage of material from the beads 10 during welding occurs on the inside and not the outside, which would cause irritation to the animal's ear.

Figure 1:
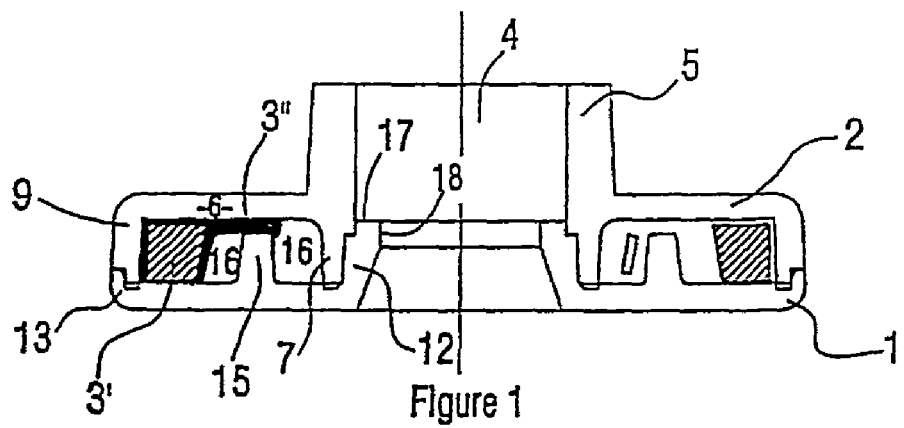
FIG. 1 is a cross-sectional view of a button tag according to the invention showing the assembly of the two half-shells and the transponder.

As shown in the figures and more particularly in FIG. 1, the height of the walls 7, 9 and of the rim 13 delimit the space established with a functional clearance of approximately ×0.1 millimeters to hold the transponder in place without damaging it on assembly.

On the internal face between the rim 13 and the cylindrical wall 12, an annular projection 15 is provided, its height being less than the clear height within the button tag, that is to say less than the height of the walls 7 and 9 of the half-shell 2.

The projection enables the microprocessor 3 to be located in the glue 16 fixing it in place, the glue being distributed on both sides of the projection 15.

The glue is used to fix in place the entire transponder, both coil and microprocessor, protecting it against mechanical damage such as impact damage, and also against thermal damage.

The glue used is chemically inert.

It has an expansion coefficient compatible with that of the-copper and welds of the transponder.

The internal cylindrical wall 12 of the lower half-shell has a conical form, in the form of a conical frustrum, wider at its base towards the outside than at its vertex towards the inside.

The base of the opening formed by the cylindrical wall 12 has a diameter approximately equal to that of the sleeve 4, and its vertex is provided with a cylindrical terminal portion 18 having a smaller diameter than its base and the sleeve 4, having an upper shoulder 17 that is substantially flat.

This configuration enables the conical tip of the male punch to lock into position as when it has passed beyond the shoulder 17 it cannot be retracted.

The button tag carries out the function of the female head in the male panel/female head pairing discussed in the introduction. This female head formed by the button tag may be open as shown, with the sleeve 4 being open-ended, or closed, the sleeve 4 being blind at the end on the upper half-shell to prevent access to the conical tip of the of the punch on the male panel tag.

The welding operation is carried out by means of a diode laser system with a suitable wavelength, for example 904 to 940 nm.

The attraction of laser welding lies in the fact that it can be directly targeted on the flux cores 10, which avoids any deterioration of the half-shells and the transponder.

FIG. 4 represents a further embodiment of the transponder 3. The latter is provided with a processor 3" which is folded down and glued onto the coil 3', the unit being fixed in position by the substance 16 which can be a glue or a gel or any other suitable material.

The thickness of the transponder 3 according to this embodiment is such that it fills the internal volume of the two half-shells 1-2 when fitted together, the glue 16 fixing the unit in position.

Figure 2:
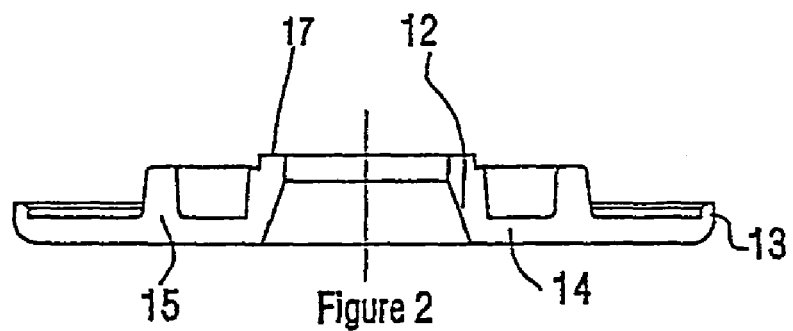
FIG. 2 is a cross-sectional view of the lower half-shell.
Figure 3:
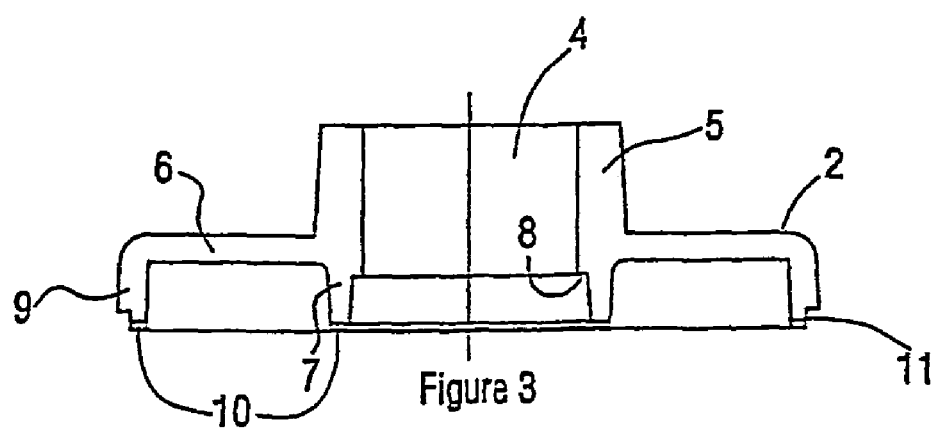
FIG. 3 is a cross-sectional view of the upper half-shell on the same axis as that shown in FIG. 1.

In this embodiment it is unnecessary to provide the projection 15 shown in FIGS. 2 and 3.

The invention claimed is:

1. An animal tagging and identification electronic button tag comprising a transponder arranged to uniquely identify an animal in a group of animals, capable of being programmed, enclosed in a shell, said shell comprising a blind axial transverse passage for receiving a punch of a male tag panel to fix the shell to an ear of the animal, wherein the shell is made from two half-shells namely a lower half-shell and an upper half-shell, which are assembled together at a median plane which is disposed transversely to the axial transverse passage, and the transponder is enclosed within the two half-shells;

wherein the upper half-shell comprises a sleeve with a blind central opening around the median axis, which opening forms part of the axial transverse passage of the shell, the sleeve being formed by a cylindrical wall which projects from a planar wall of the upper half-shell and is extended by an inner cylindrical wall below said planar wall to connect with a corresponding inner cylindrical wall on the lower half-shell, the planar wall of the upper half-shell being connected at its periphery to an outer cylindrical wall for connection to the lower half-shell; and wherein the inner cylindrical wall of the lower half-shell has an opening with a conical form, which opening forms part of the axial transverse passage of the shell, and an upper shoulder enabling a tip of the punch of a male panel tag to be locked into the shell.

2. The electronic button tag according to claim 1, wherein the walls of the two half-shells contribute to their assembly, stiffen the shell and fix the internal transponder in place.

3. The electronic button tag according to claim 1, wherein:
the inner cylindrical wall of the lower half-shell is positioned around a median axis corresponding to that of the sleeve of the upper half-shell, and
the lower half shell includes a projecting peripheral rim which cooperates with the outer cylindrical wall of the upper half-shell.

4. The electronic button tag according to claim 3, including an internal projection extending from a planar wall of the lower half shell and positioned between the inner cylindrical wall of the lower half shell and the peripheral rim.

5. The electronic button tag according to claim 4, wherein the internal projection is of a lesser height than the distance between the planar wall of the upper half-shell and an opposite planar wall of the lower half-shell.

6. The electronic button tag according to claim 1, wherein the ends of the inner and outer cylindrical walls of the upper half-shell are provided with flux cores.

7. The electronic button tag according to claim 6, wherein the flux cores are laser welded.

8. The electronic button tag according to claim 1, wherein a processor of the transponder is folded down onto a coil, the processor being fixed into position by a glue.

9. The electronic button tag according to claim 1, wherein the lower half-shell is provided with a peripheral rim which on assembly fits into an external shoulder of the vertical outer cylindrical wall of the upper half-shell.

10. The electronic button tag according to claim 1, wherein the two half-shells have substantially a same radius about the median axis.

11. An electronic button tag for tagging and identifying cattle, the button tag including:
a shell; and
a transponder which is capable of being programmed, the transponder being enclosed in the shell;
wherein:
the shell includes a first shell portion and a second shell portion which are assembled together at a median plane, the transponder being enclosed without compression between the two shell portions and attached to the shell using an adhesive;
the two shell portions are assembled by means of a laser weld;
the second shell portion includes a sleeve with a blind central opening around a median axis, said sleeve being blind, projecting outwards from one side of a planar wall of the second shell portion and being extended by a cylindrical wall extending from an opposite side of said planar wall to connect with a cylindrical wall of the first shell portion, a planar wall of the first shell portion being connected at its periphery to the second shell portion; and
the ends of the cylindrical wall and a peripheral wall of the second shell portion are provided with flux cores and the flux cores are laser welded; and
the walls of the two shell portions contribute to their assembly, stiffen the shell and fix the internal transponder in place.

12. The electronic button tag according to claim 11 wherein the cylindrical wall of the first shell portion provides a passage for a punch of a male tag for fixing the tag to the ear of an animal, said cylindrical wall of the first shell portion having a conical form and providing a shoulder within the sleeve to enable the tip of the punch of a male tag to be locked in the sleeve.

13. The electronic button tag as claimed in claim 12, wherein an internal projection is located between the cylindrical wall and a peripheral rim of the second shell portion, the internal projection being of a height less than the distance between the planar walls of the first and second shell portions.

14. The electronic button tag according to claim 11, wherein the first shell portion is provided with a peripheral rim which on assembly fits into an external shoulder of a peripheral wall of the second shell portion.

15. The electronic button tag as claimed in claim 11 or 12, wherein a processor of the transponder is located on a coil, the processor being fixed into position by the adhesive.

16. An electronic button tag for tagging and identifying cattle comprising:
a transponder, capable of being programmed, enclosed within a shell, the shell being made from two half-shells namely a lower half-shell and an upper half-shell, which are assembled together at a median plane which is disposed transversely to an axial passage opening for receiving a fixing means, the two half-shells being provided with complementary internal and external walls, contributing to their assembly, to stiffen the shell and to fix the internal transponder in place, wherein the upper half-shell has a sleeve with a central opening around the median axis, which central opening forms part of the axial passage opening, and wherein a cylindrical wall extends below a planar wall of the upper half-shell to connect with a corresponding lower cylindrical wall on the lower half-shell, the planar wall of the upper half shell being connected at its periphery to a vertical outer cylindrical wall connecting it to the lower half-shell, and wherein the transponder is fixed in place without compression between the two half-shells using a glue, the two half-shells being assembled by means of a laser weld; and
wherein ends of the cylindrical walls of the upper half-shell are provided with flux cores.

17. The electronic button tag according to claim 16, wherein the lower cylindrical wall includes a peripheral rim cooperating with an orthogonal peripheral wall of the upper half-shell.

18. The electronic button tag according to claim 17, wherein an internal projection is positioned between the lower cylindrical wall and the peripheral rim.

19. The electronic button tag according to claim 17, wherein the internal projection is of a lesser height than the distance between the planar wall of the upper half-shell and an opposite planar wall of the lower half shell.

20. The electronic button tag according to claim 16, wherein the lower cylindrical wall has a conical form with an upper shoulder enabling a tip of a punch of a male panel tag to be locked into the shell.

21. The electronic button tag according to claim 16, wherein a processor of the transponder is folded down onto the coil, the processor being fixed into position by the glue.

22. The electronic button tag according to claim 16, wherein the flux cores are laser welded.

* * * * *